United States Patent
Tosaya et al.

(10) Patent No.: US 9,929,395 B2
(45) Date of Patent: Mar. 27, 2018

(54) BATTERY ROUTING ELECTRIC WIRE AND WIRE HARNESS

(71) Applicant: YAZAKI CORPORATION, Tokyo (JP)

(72) Inventors: Yuki Tosaya, Susono (JP); Hiroki Kondo, Susono (JP); Namiko Yasuda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/273,882

(22) Filed: Sep. 23, 2016

(65) Prior Publication Data

US 2017/0092927 A1 Mar. 30, 2017

(30) Foreign Application Priority Data

Sep. 25, 2015 (JP) .................................. 2015-187728

(51) Int. Cl.
*H01M 2/34* (2006.01)
*H01B 3/44* (2006.01)
*H01B 7/00* (2006.01)

(52) U.S. Cl.
CPC .............. *H01M 2/34* (2013.01); *H01B 3/445* (2013.01); *H01B 7/0045* (2013.01); *H01M 2200/00* (2013.01); *H01M 2220/20* (2013.01)

(58) Field of Classification Search
CPC ............ B60R 16/0207; B60R 16/0215; B60R 16/023; H01B 7/0045; H01B 3/445; H01M 2/34
See application file for complete search history.

(56) References Cited

U.S. PATENT DOCUMENTS

| 2004/0029454 A1* | 2/2004 | Onuma | H01R 11/28 439/747 |
| 2012/0038365 A1* | 2/2012 | Nagata | H01M 2/206 324/433 |
| 2014/0060925 A1* | 3/2014 | Furukawa | H01B 7/04 174/72 A |

FOREIGN PATENT DOCUMENTS

| JP | 54-101380 U1 | 12/1978 |
| JP | 2008-262733 A | 10/2008 |
| JP | 2010-73486 A | 4/2010 |
| JP | 2010257686 A | 11/2010 |
| JP | 2012-252869 A | 12/2012 |
| JP | 201493163 A | 5/2014 |
| JP | 201590760 A | 5/2015 |

OTHER PUBLICATIONS

Communication dated Oct. 11, 2017, issued by the Japanese Patent Office in Japanese application No. 2015-187728.

* cited by examiner

*Primary Examiner* — Timothy Thompson
*Assistant Examiner* — Amol Patel
(74) *Attorney, Agent, or Firm* — Sughrue Mion, PLLC

(57) ABSTRACT

A battery routing electric wire is routed between a battery having an alkaline electrolytic solution and a device. The battery routing electric wire includes: a conduction portion formed of a single wire; and a cover portion that covers the conduction portion and is made of polyvinyl chloride.

3 Claims, 4 Drawing Sheets

LENGTH OF ELECTRIC WIRE SAMPLE: 30+α cm

INITIAL LIQUID SURFACE

C1

KOH

ONE END

C2

OTHER END

| | CROSS-SECTION | SIZE AND SPECIFICATION | INSULATOR | RESULT |
|---|---|---|---|---|
| EXAMPLE 1 | | 0.3 mm² SINGLE WIRE | PVC | 3mm |
| COMPARATIVE EXAMPLE 1 | | 0.3 mm² 7 WIRES TWISTED | PVC | 300mm |
| COMPARATIVE EXAMPLE 2 | | 0.3 mm² 19 WIRES TWISTED | PVC | 300mm |

*FIG. 7*

| | CROSS-SECTION | SIZE AND SPECIFICATION | INSULATOR | RESULT |
|---|---|---|---|---|
| EXAMPLE 1 | | 0.3 mm² SINGLE WIRE | PVC | 3mm |
| COMPARATIVE EXAMPLE 3 | | 0.3 mm² SINGLE WIRE | PE | 300mm |
| COMPARATIVE EXAMPLE 4 | | 0.3 mm² SINGLE WIRE | PP | 300mm |

*FIG. 8*

| | CROSS-SECTION | SIZE AND SPECIFICATION | INSULATOR | RESULT |
|---|---|---|---|---|
| EXAMPLE 2 | | 0.3 mm² SINGLE WIRE | PVC POLYMERIZATION DEGREE: 2,000 | 3mm |
| EXAMPLE 3 | | 0.3 mm² SINGLE WIRE | PVC POLYMERIZATION DEGREE: 1,000 | 3mm |
| EXAMPLE 4 | | 0.3 mm² SINGLE WIRE | PVC POLYMERIZATION DEGREE: 500 | 200mm |

BATTERY ROUTING ELECTRIC WIRE AND WIRE HARNESS

CROSS-REFERENCE TO RELATED APPLICATION(S)

This application is based on and claims priority from Japanese Patent Application (Application No. 2015-187728) filed on Sep. 25, 2016, the entire contents of which are incorporated herein by reference.

BACKGROUND

1. Field of the Invention

The present invention relates to a battery routing electric wire and a wire harness.

2. Description of Related Art

In the related art, it is known that a battery that is formed by connecting a plurality of unit cells in series is mounted on a HEV vehicle and the like. As such a battery, for example, it is known that a nickel hydride battery is used. An electrolytic solution is sealed in the nickel hydride battery and some gas is generated in an inside of the nickel hydride battery during charging and discharging. Scarcely any of the generated gas is discharged to the outside during normal charging and discharging. Gas is abnormally generated during forced discharging in an over-discharge state, during continued over-charging, and during discharging a large current and during short-circuiting causing a rapid temperature rise, thereby not being absorbed in the inside of the battery. In such a case, a safety valve (gas discharge valve) may be provided in the battery to prevent the battery from bursting due to an abnormal pressure rise in the battery.

However, in a case where the safety valve described above is operated, the electrolytic solution in the inside thereof may leak at the same time as the discharge of gas. In addition, the electrolytic solution may leak due to various reasons such as creep deformation due to a battery temperature rise other than during the operation of the safety valve. Then, if the electrolytic solution leaks, the electrolytic solution may be transmitted to an electric wire connecting the battery and a device (for example, an electronic circuit board) due to the capillary phenomenon and the device can be broken (short-circuited).

As a countermeasure, a technique, in which a crimping surface side (side on which a crimping barrel extends) of terminals attached to the electric wire faces a side opposite to an electrode of the battery or a sealing material such as a water-absorbent polymer sheet is provided in the inside of the electric wire and the electrolytic solution is absorbed and adsorbed, is proposed (see JP-A-2010-257686).

SUMMARY

However, in the countermeasure described in JP-A-2010-257686, the orientation of the terminals is limited or an increase in the number of processing steps due to the sealing material is caused.

The invention is made in order to solve the conventional problem described above and an object of the invention is to provide a battery routing electric wire and a wire harness in which an increase in processing steps can be prevented without limiting an orientation of terminals, while preventing breakage of a device due to an electrolytic solution.

A battery routing electric wire of an aspect of the invention is routed between a battery having an alkaline electrolytic solution and a device, and includes a conduction portion formed of a single wire and a cover portion that covers the conduction portion and is made of polyvinyl chloride.

According to the battery routing electric wire of the aspect of the invention, since the conduction portion is formed of the single wire, the electrolytic solution is difficultly to be sucked up due to the capillary phenomenon compared to a case of a twisted wire. In addition, since the cover portion is made of the polyvinyl chloride, the alkaline electrolytic solution is changed into water by a chemical reaction and sucking up of the electrolytic solution due to the capillary phenomenon is suppressed. Therefore, a possibility of the liquid extending to the device can be reduced. Furthermore, there is no need to cause the orientation of terminals attached to the electric wire to be a predetermined direction or to perform a water repelling process such as soldering in the terminals of the electric wire. Therefore, it is possible to prevent an increase in the number of processing steps without limiting the orientation of the terminals while preventing breakage of the device due to an electrolytic solution.

In addition, in the battery routing electric wire, when 72 hours have elapsed in a state in which one end surface of the electric wire is immersed in the alkaline electrolytic solution by 10 mm, and an entire electric wire is disposed to be substantially semicircular, a traveling length of a liquid between the conduction portion and the cover portion may be equal to or less than 200 mm.

According to the battery routing electric wire, when 72 hours have elapsed in a state in which one end surface of the electric wire is immersed in the alkaline electrolytic solution by 10 mm, and the entire electric wire is disposed to be substantially semicircular, the traveling length of the liquid between the conduction portion and the cover portion is equal to or less than 200 mm. Therefore, if the battery and the device are connected by an electric wire having a length exceeding 200 mm, it is possible to reduce a possibility of the liquid reaching the device even when the electrolytic solution leaks.

In addition, in the battery routing electric wire, a polymerization degree of polyvinyl chloride may be equal to or greater than 1000.

According to the battery routing electric wire, the polymerization degree of the polyvinyl chloride is equal to or greater than 1000. Therefore, a possibility of the liquid extending to the device can be reduced. A possibility of breakage of the device can be further reduced.

In addition, a wire harness of another aspect of the invention includes the battery routing electric wire according to any one of above descriptions.

According to the wire harness, it is possible to provide the wire harness in which a possibility of the device breaking is reduced and it is possible to prevent an increase in the number of processing steps.

According to aspects of the invention, it is possible to provide the battery routing electric wire and the wire harness using the battery routing electric wire in which a possibility of the device breaking is reduced and it is possible to prevent an increase in the number of processing steps.

BRIEF DESCRIPTION OF THE DRAWINGS

FIGS. 3A and 3B are schematic views illustrating a state of sucking-up of an electrolytic solution, in which FIG. 3A illustrates an example according to the embodiment and FIG. 3B illustrates an example of a case where a conduction portion is a twisted wire.

FIG. 7 is a second table illustrating a measurement result of a rise of the liquid surface with respect to various electric wire samples.

FIG. 8 is a third table illustrating a measurement result of a rise of the liquid surface with respect to various electric wire samples.

DETAILED DESCRIPTION

Hereinafter, a preferable embodiment of the invention will be described with reference to the drawings, but the invention is not limited to the following description and can be appropriately changed within a range without departing from the spirit of the invention.

Figure 1:
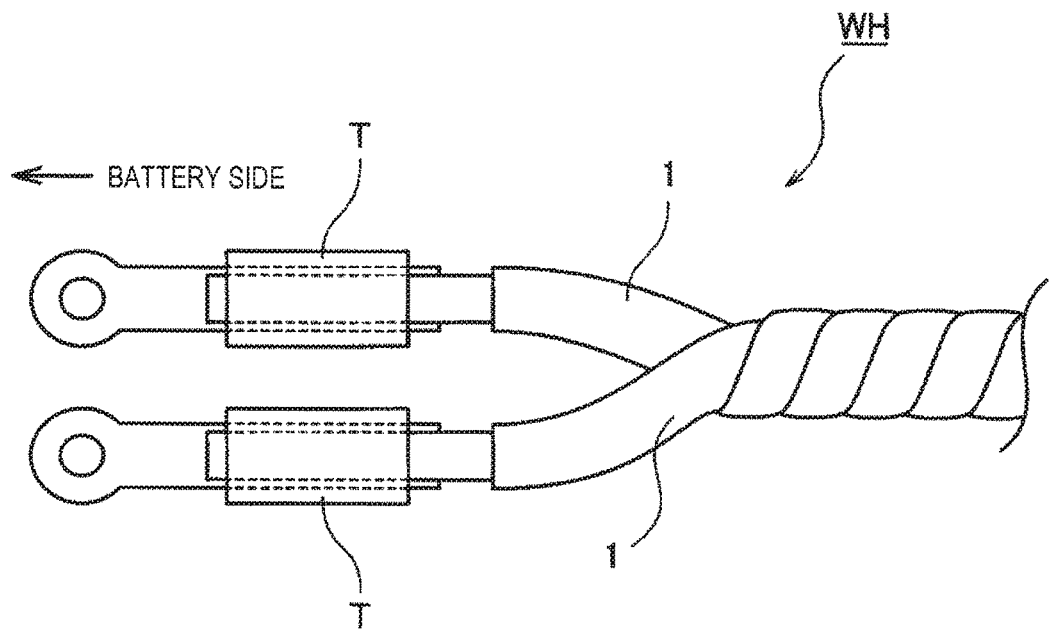
FIG. 1 is a view of a wire harness including a battery routing electric wire according to an embodiment.

FIG. 1 is a view of a wire harness including a battery routing electric wire according to an embodiment. As illustrated in FIG. 1, a wire harness WH is configured of at least one battery routing electric wire 1 and another component (at least one of an electric wire of the same type or different types, a terminal, a connector, a tape, and a corrugated tube), and, in the embodiment, is configured to include a plurality (two) of battery routing electric wires 1. The plurality of battery routing electric wires 1 are collectively tape-wounded.

Such a wire harness WH includes, for example, LA-terminals T at end portions of at least one side of the battery routing electric wires 1, the LA-terminals T are connected to a battery side, and a terminal position of the electric wire 1 is positioned within a predetermined distance from the battery. For example, the LA-terminal T is connected to a battery post or a bus bar or the like attached to the battery post. The battery that is an object to be connected is, for example, a high voltage battery which has an alkaline electrolytic solution, in which hydroxide ions are ion conductors, and which is formed by connecting a plurality of cells made by immersing the alkaline electrolytic solution in a separator between the electrodes. Moreover, even though not illustrated, the other end thereof is connected to various devices (electronic circuit board and the like), the LA-terminal T may be connected to the other end similar to one end, or another component such as a connector may be connected.

In such a wire harness WH, since the terminals of the battery routing electric wire 1 are positioned within a predetermined distance from the battery, if a safety valve of the battery is operated and the electrolytic solution leaks, the electrolytic solution may be applied to the terminals of the electric wire 1 and, in this case, the electrolytic solution reaches a device on an opposite terminal side through the battery routing electric wire 1 due to the capillary phenomenon, and the device may be broken. In addition, the electrolytic solution leaks for various reasons such as creep deformation due to an increase in battery temperature other than during the operation of the safety valve. As a countermeasure thereof, there is a technique in which a crimping surface side (side on which a crimping barrel extends) of the terminal attached to the electric wire faces a side opposite to the electrode of the battery or a technique in which a sheet material such as a water-absorbent polymer sheet is provided in an inside of the electric wire and the electrolytic solution is absorbed and adsorbed. However, in this case, the orientation of the terminal is limited or the increase in the number of processing steps by the sealing material is caused.

Then, in the embodiment, the battery routing electric wire 1 has the following configuration.

Figure 2:
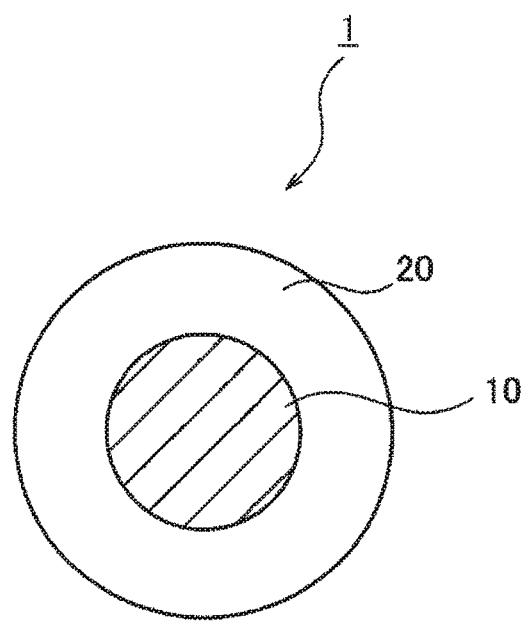
FIG. 2 is a sectional view illustrating the battery routing electric wire illustrated in FIG. 1.

FIG. 2 is a sectional view illustrating the battery routing electric wire 1 illustrated in FIG. 1. As illustrated in FIG. 2, the battery routing electric wire 1 includes a conduction portion 10 and a cover portion 20 that covers the conduction portion 10. Moreover, the battery routing electric wire 1 may include other configurations on an outer periphery side of the configurations 10 and 20.

The conduction portion 10 is a conductive metal member for supplying electric power from the battery to the device and, in the embodiment, the conduction portion 10 is configured of a copper material such as pure copper or a copper alloy. Furthermore, in the embodiment, the conduction portion 10 is configured of a single wire. That is, the conduction portion 10 according to the embodiment is not configured of a twisted wire. The cover portion 20 is an insulator that covers the conduction portion 10 and, in the embodiment, the cover portion 20 is configured of polyvinyl chloride (PVC).

Figure 3A:
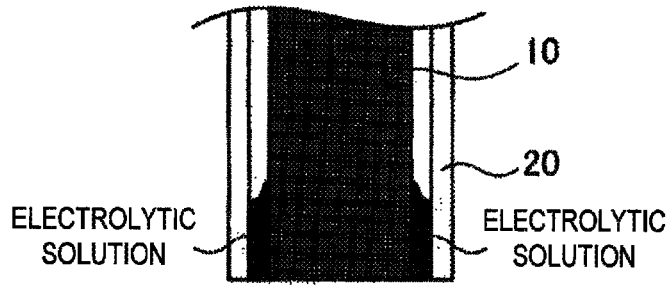
Figure 3B:
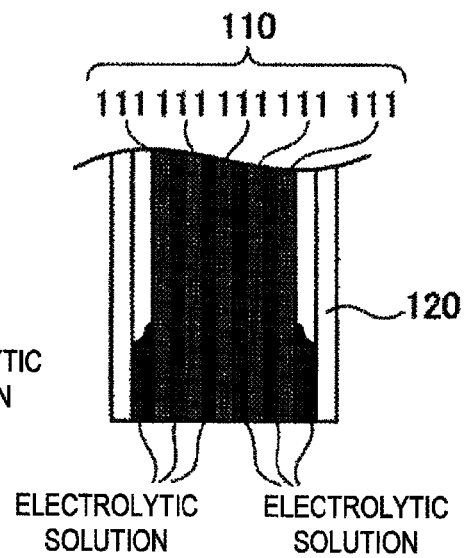

FIGS. 3A and 3B are schematic views illustrating a state of sucking-up of an electrolytic solution, in which FIG. 3A illustrates an example according to the embodiment and FIG. 3B illustrates an example of a case where the conduction portion is the twisted wire. As illustrated in FIG. 3A, in the battery routing electric wire 1 according to the embodiment, a portion in which the electrolytic solution is sucked up due to the capillary phenomenon is only between the conduction portion 10 and the cover portion 20, and the electrolytic solution is difficultly to be sucked up. In contrast, as illustrated in FIG. 3B, in a case where a conduction portion 110 is configured of the twisted wire, the capillary phenomenon is also generated between wire elements 111 configuring the twisted wire in addition to the portion between the conduction portion 110 and the cover portion 120. Therefore, the electrolytic solution is easily to be sucked up. Thus, the conduction portion 10 of the battery routing electric wire 1 according to the embodiment is the single wire.

Figure 4:
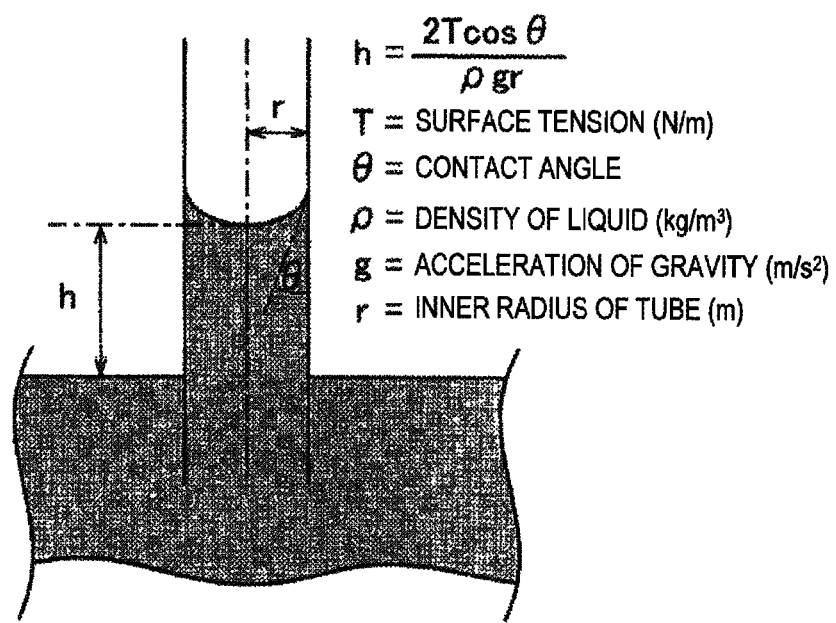
FIG. 4 is a view illustrating a height of a liquid surface due to the sucking-up of the liquid due to a capillary phenomenon.

FIG. 4 is a view illustrating a height of a liquid surface due to the sucking-up of the liquid due to the capillary phenomenon. As illustrated in FIG. 4, a height h of the liquid surface that is raised due to the capillary phenomenon can be obtained by a formula of $h = 2T \cos \theta / \mu g r$. Here, T is the surface tension (N/m), $\theta$ is a liquid intrinsic contact angle with respect to a tube inner wall, and $\rho$ is a liquid density (kg/m$^3$). In addition, g is an acceleration of gravity (m/s$^2$) and r is an inner radius (m) of a tube. As it is apparent from the above formula, the height h of the liquid surface is greatly changed by the liquid intrinsic density $\rho$ and the contact angle $\theta$.

Here, if the alkaline electrolytic solution is potassium hydroxide (KOH) solution, the following chemical reaction occurs with PVC that is the cover portion 20.

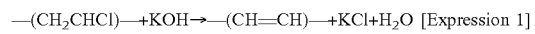

—(CH$_2$CHCl)—+KOH→—(CH=CH)—+KCl+H$_2$O [Expression 1]

Therefore, the alkaline electrolytic solution is changed into water. Since the density of water is lower than that of potassium hydroxide solution that is the alkaline electrolytic solution and a contact angle thereof is greater than that of potassium hydroxide solution, the height h of the liquid surface is small. Therefore, even in a case where leakage of the electrolytic solution occurs, a possibility of the liquid reaching the device through the battery routing electric wire 1 is reduced.

Moreover, since the conduction portion 10 of the battery routing electric wire 1 according to the embodiment is formed of the copper material, the following chemical reaction also occurs.

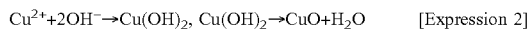
$$Cu^{2+}+2OH^-\rightarrow Cu(OH)_2, Cu(OH)_2\rightarrow CuO+H_2O \quad \text{[Expression 2]}$$

As described above, the alkaline electrolytic solution is also changed to water by the conduction portion 10. In this case, the copper material is oxidized and is discolored.

Figures 5, 6:
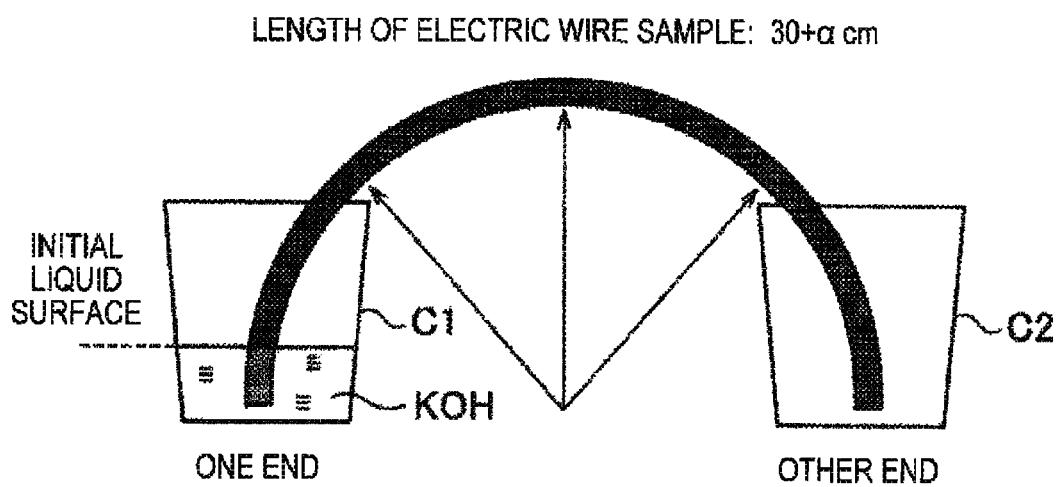
FIG. 5 is a view illustrating a state of an electric wire sample when measuring a rise of the liquid surface with respect to various electric wire samples.
FIG. 6 is a first table illustrating a measurement result of a rise of the liquid surface with respect to various electric wire samples.

Next, test results with respect to the example of the battery routing electric wire 1 according to the embodiment and comparative examples will be described. FIG. 5 is a view illustrating a state of an electric wire sample when measuring an increase in the liquid surface with respect to various electric wire samples. As illustrated in FIG. 5, two containers C1 and C2 were prepared, 20 ml of potassium hydroxide solution was put into one container C1 and the other container C2 was vacant. Then, one ends of the battery routing electric wire (hereinafter, the battery routing electric wire according to the example is simply referred to as the electric wire) of the example and electric wires according to the comparative examples were immersed in potassium hydroxide solution of the first container C1 and the other ends thereof are positioned in the second container C2, and entire electric wires were disposed to be substantially semi-circular. Thereafter, it was measured how far the liquid traveled to the other end side of the electric wire with respect to an initial position of the liquid surface when the electric wires were left for 72 hours in this state. Moreover, the length of the electric wire was 30+1 cm, one end of the electric wire was immersed in potassium hydroxide solution by 10 mm, and the length of the electric wire on the other end side from the initial position of the liquid surface was 30 cm. In addition, the container C1 is a cylindrical container of which a bottom area is 15.2 cm².

FIG. 6 is a first table illustrating a measurement result of a rise of the liquid surface with respect to various electric wire samples.

The conduction portion of the electric wire according to Example 1 was configured of, for example, pure copper and the electric wire was realized with the single wire of which an area of a conduction portion is 0.3 mm². In addition, an insulator that is used for the cover portion was configured of PVC. A conduction portion of an electric wire according to Comparative Example 1 was configured of, for example, pure copper, an area of a conduction portion was 0.3 mm² and the electric wire was realized by twisting 7 wires. In addition, an insulator that is used for the cover portion was configured of PVC. A conduction portion of an electric wire according to Comparative Example 2 was configured of, for example, pure copper, an area of a conduction portion was 0.3 mm² and the electric wire was realized by twisting 19 wires. In addition, an insulator that is used for the cover portion was configured of PVC.

In the electric wire according to Example 1, the liquid traveled to the other end side of the electric wire only to 3 mm with respect to the initial position of the liquid surface. In contrast, in the electric wires according to Comparative Examples 1 and 2, the liquid traveled to the other end side of the electric wire by 300 mm with respect to the initial position of the liquid surface. Therefore, it was found that the liquid is difficultly to travel within the electric wire in the conduction portion which is configured of the single wire compared to the conduction portion which is configured by twisting a plurality of wire elements.

FIG. 7 is a second table illustrating a measurement result of a rise of the liquid surface with respect to various electric wire samples.

The electric wire according to Embodiment 1 is the same as the above description. A conduction portion of an electric wire according to Comparative Example 3 was configured of, for example, pure copper, an area of a conduction portion was 0.3 mm², and the electric wire was realized by the single wire. In addition, an insulator that is used for a cover portion was configured of polyethylene (PE). A conduction portion of an electric wire according to Comparative Example 4 was configured of, for example, pure copper, an area of the conduction portion was 0.3 mm², and the electric wire was realized by the single wire. In addition, an insulator that is used for a cover portion was configured of polypropylene (PP).

In the electric wire according to Example 1, the liquid traveled to the other end side of the electric wire only by 3 mm with respect to the initial position of the liquid surface. In contrast, in the electric wires according to Comparative Examples 3 and 4, the liquid traveled to the other end side of the electric wire by 300 mm with respect to the initial position of the liquid surface. Therefore, it was found that the liquid is difficultly to travel within the electric wire if the insulator that is used for the cover portion is PVC.

FIG. 8 is a third table illustrating a measurement result of a rise of the liquid surface with respect to various electric wire samples.

A conduction portion of an electric wire according to Comparative Examples 2 to 4 was configured of, for example, pure copper, an area of a conduction portion was 0.3 mm², and the electric wire was realized by the single wire. In addition, an insulator that is used for a cover portion was configured of PVC. In the electric wire according to Example 2, a polymerization degree of PVC that is the insulator was 2000, in the electric wire according to Example 3, a polymerization degree of PVC that is the insulator was 1000, and in the electric wire according to Example 4, a polymerization degree of PVC that is the insulator was 500.

In the electric wires according to Examples 2 and 3, the liquid traveled to the other end side of the electric wire only by 3 mm with respect to the initial position of the liquid surface. In addition, in the electric wire according to Example 4, the liquid traveled to the other end side of the electric wire by 200 mm with respect to the initial position of the liquid surface. If the polymerization degree of PVC that is the insulator is equal to or greater than 500, it was found that the traveling length of the liquid between the conduction portion and the cover portion could be equal to or less than 200 mm. Therefore, it was found that the liquid is further difficultly to travel within the electric wire if the polymerization degree of PVC that is the insulator is equal to or greater than 1000.

Moreover, the traveling length described above may also be changed by other factors such as an adhesion degree between the conduction portion 10 and the cover portion 20 and a diameter of the conduction portion 10.

Therefore, according to the battery routing electric wire 1 and the wire harness WH of the embodiment, since the conduction portion 10 is the single wire, the electrolytic solution is difficultly to be sucked up due to the capillary phenomenon compared to a case of the twisted wire. In addition, since the cover portion 20 is formed of polyvinyl chloride, the alkaline electrolytic solution is changed to water by the chemical reaction and the sucking-up due to the capillary phenomenon is suppressed. Therefore, a possibility of the liquid reaching the device can be reduced. Furthermore, there is no need to make the orientation of the terminal attached to the electric wire to be a predetermined direction or to perform the water repelling process such as soldering in the terminal of the electric wire. Therefore, an increase in the number of processing steps can be suppressed without limiting the orientation of terminals while breakage of the device due to the electrolytic solution is prevented.

In addition, one end surface is immersed in the alkaline electrolytic solution by 10 mm, an entire electric wire is disposed so as to be substantially semicircular, and the traveling length of the liquid between the conduction portion 10 and the cover portion 20 can be equal to or less than 200 mm when 72 hours have elapsed. Thus, if the electric wire 1 having a length exceeding 200 mm connects between the battery and the device, a possibility of the liquid reaching the device can be reduced even when the electrolytic solution leaks.

In addition, if the polymerization degree of polyvinyl chloride is equal to or greater than 1000, a possibility of the liquid reaching the device can be further reduced and a possibility of the device being broken can be further reduced.

Above, the invention is described with reference to the embodiment, but the invention is not limited to the embodiment, and changes may be added within a range without departing from the spirit of the invention.

For example, it is preferable that the conduction portion 10 of the battery routing electric wire 1 according to the embodiment is formed of the copper material, but is not particularly limited, and may be another conduction portion formed of aluminum, aluminum alloy, or the like.

In addition, the battery routing electric wire 1 according to the embodiment is not limited to a battery routing electric wire which is directly connected to the battery and may be connected to the battery via another member attached to the battery.

What is claimed is:

1. A battery routing electric wire that is routed between a battery having an alkaline electrolytic solution and a device, said battery routing electric wire comprising:
    a conduction portion formed of a single wire; and
    a cover portion that covers the conduction portion and is made of polyvinyl chloride;
    wherein when 72 hours have elapsed in a state in which one end surface of the electric wire is immersed in an alkaline electrolytic solution by 10 mm, and the entire electric wire is disposed to be substantially semicircular, a traveling length of a liquid between the conduction portion and the cover portion is equal to or less than 200 mm.

2. The battery routing electric wire according to claim 1, wherein a polymerization degree of polyvinyl chloride is equal to or greater than 1000.

3. A wire harness comprising:
the battery routing electric wire according to claim 1.

* * * * *